United States Patent
Alexander et al.

(10) Patent No.: US 12,410,021 B2
(45) Date of Patent: Sep. 9, 2025

(54) DEPLOYABLE TRUCK RAMP WITH BLADDERS

(71) Applicant: GM Global Technology Operations LLC, Detroit, MI (US)

(72) Inventors: Paul W. Alexander, Ypsilanti, MI (US); Wonhee Michael Kim, Royal Oak, MI (US); Craig A. Kollar, Sterling Heights, MI (US); Joseph M. Polewarczyk, Lake Orion, MI (US); Bhavesh Shah, Troy, MI (US); Rafael Gabriel Casalduc, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 373 days.

(21) Appl. No.: 18/165,474

(22) Filed: Feb. 7, 2023

(65) Prior Publication Data

US 2024/0262641 A1    Aug. 8, 2024

(51) Int. Cl.
*B65G 69/28* (2006.01)
*B60P 1/43* (2006.01)
*B62D 33/027* (2006.01)

(52) U.S. Cl.
CPC .............. *B65G 69/28* (2013.01); *B60P 1/43* (2013.01); *B62D 33/0273* (2013.01)

(58) Field of Classification Search
CPC .... B65G 69/28; B65G 69/30; B62D 33/0273; B60P 1/43
See application file for complete search history.

(56) References Cited

U.S. PATENT DOCUMENTS

| 5,184,366 | A  | * | 2/1993 | Rawdon .............. B64C 1/22 414/535 |
| 6,192,541 | B1 | * | 2/2001 | Castelli ............. E01D 15/24 405/218 |
| 10,687,634 | B1 | * | 6/2020 | Kim .................. B60N 2/914 |
| 11,572,949 | B1 | * | 2/2023 | Kim .................. F16J 3/041 |
| 2003/0082036 | A1 | * | 5/2003 | Carawan ............. B60P 1/00 414/527 |
| 2019/0106916 | A1 | * | 4/2019 | Sutherland .......... E05B 51/02 |
| 2021/0086597 | A1 | * | 3/2021 | Yen ................... B60J 7/064 |
| 2021/0114507 | A1 | * | 4/2021 | Alexander ........... B60P 7/04 |
| 2022/0212858 | A1 | * | 7/2022 | Krajewski ........... B62D 25/06 |
| 2024/0227653 | A9 | * | 7/2024 | Minjeur .............. B60P 1/43 |

\* cited by examiner

*Primary Examiner* — Kaitlin S Joerger
(74) *Attorney, Agent, or Firm* — Vivacqua Crane, PLLC

(57) ABSTRACT

A deployable ramp is provided for a cargo loading system of a vehicle. The ramp includes one or more rigid element having a surface for supporting a load. The ramp further includes one or more bladders defining a chamber that is fluidly connected to an outlet of a compressor. The chamber is adapted to receive a fluid from the compressor. The bladder is attached to rigid element, and the at bladder is movable to a collapsed state where the chamber has a first volume. The bladder is further movable to an expanded state where the chamber has a second volume and contains a pressurized fluid for supporting the rigid element, in response to the bladder receiving the fluid from the compressor. The second volume is higher than the first volume.

17 Claims, 11 Drawing Sheets

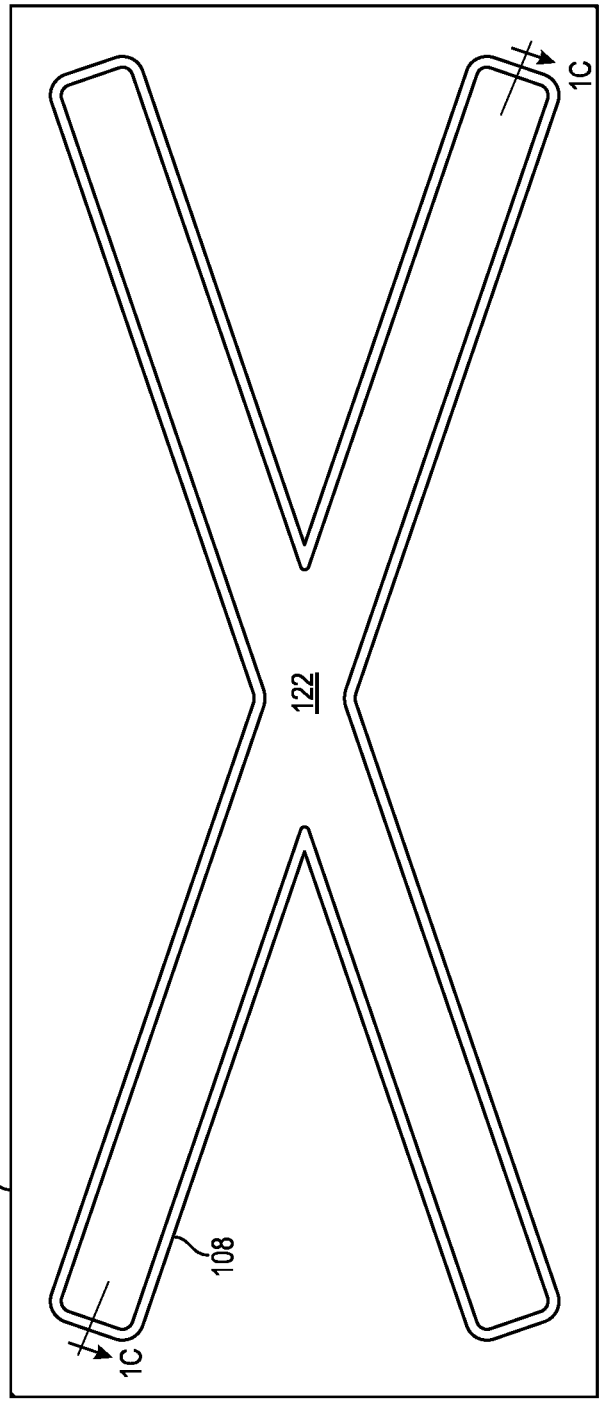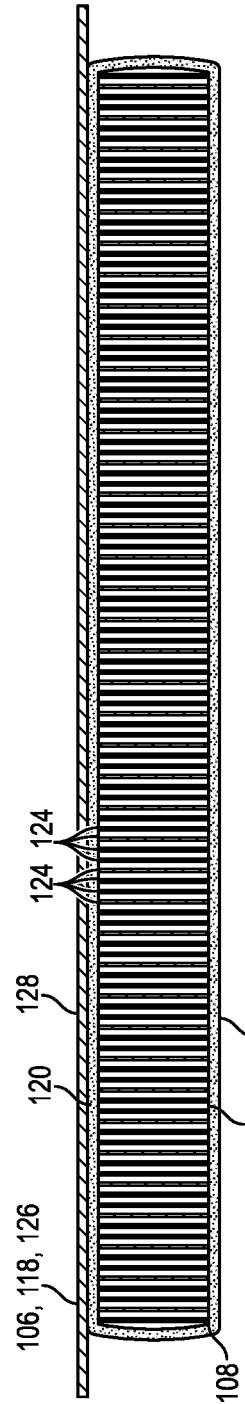

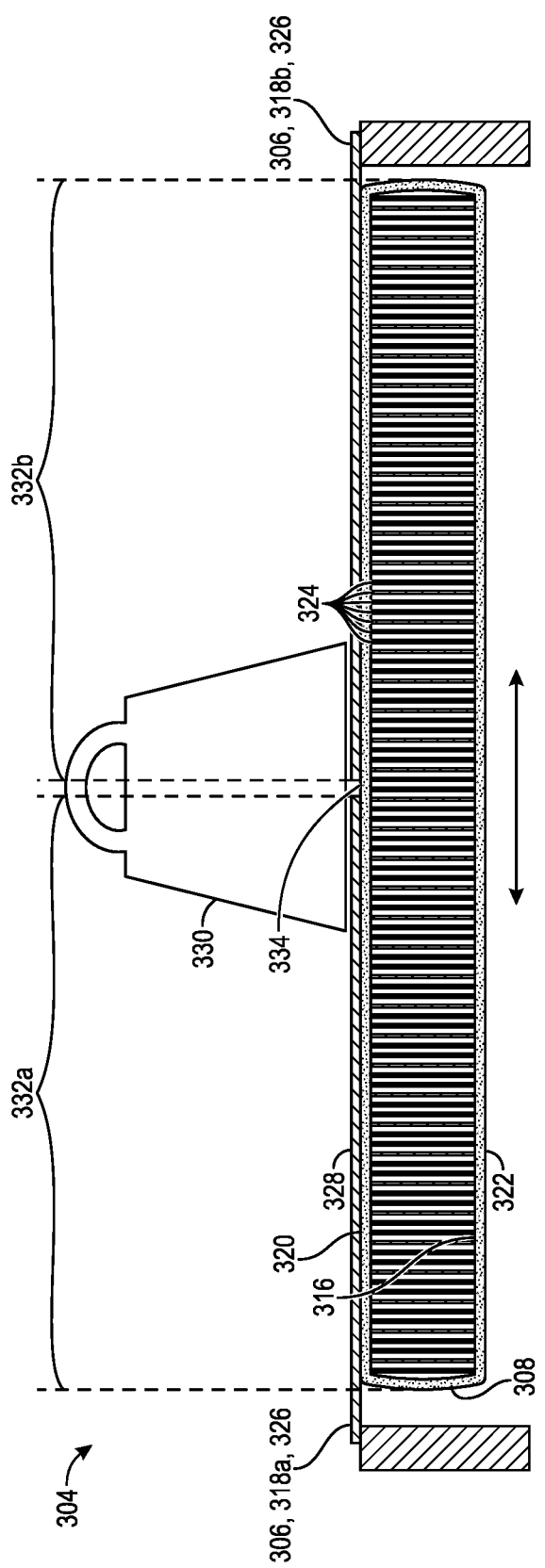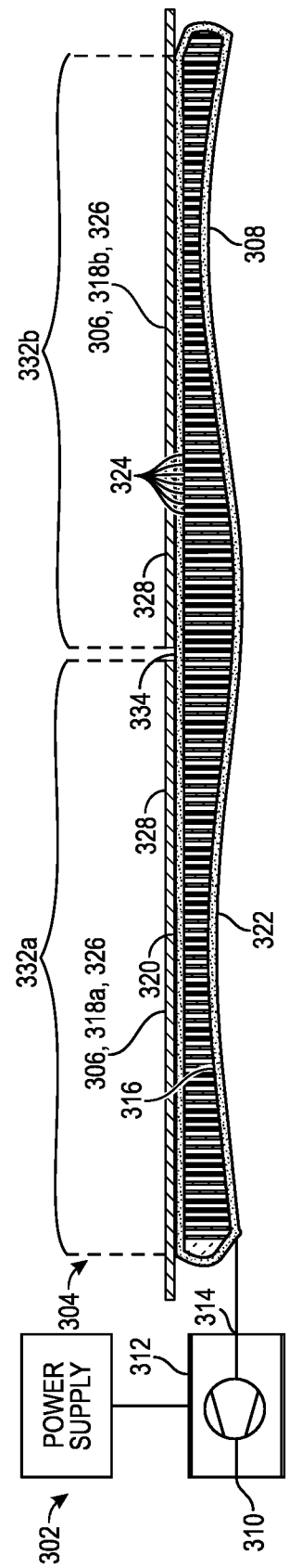
FIG. 3A
FIG. 3B

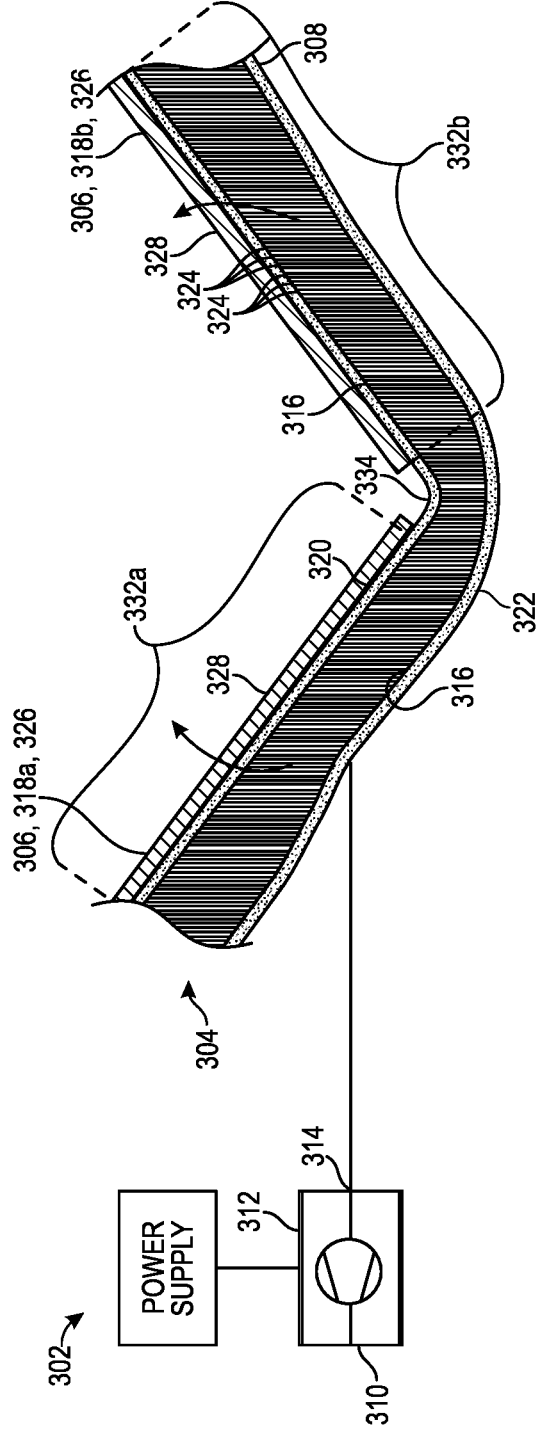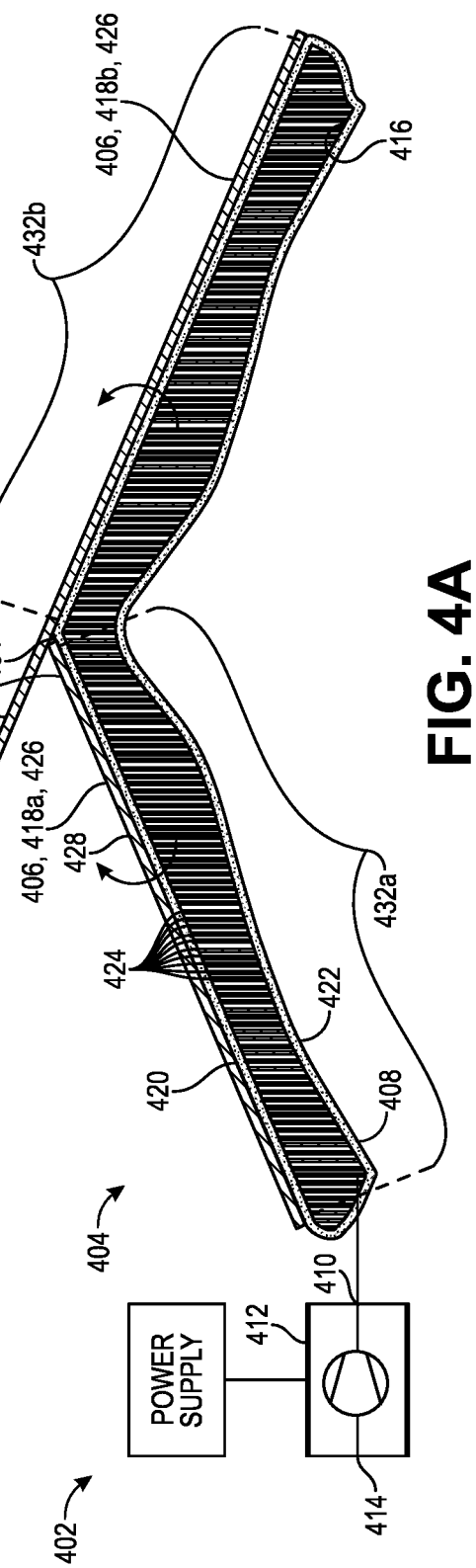

DEPLOYABLE TRUCK RAMP WITH BLADDERS

INTRODUCTION

The present disclosure relates to systems and methods for loading and unloading vehicles, and more particularly to a deployable ramp with bladders.

Automotive manufacturers are continuously investigating accessories for improving the usability and versatility of cargo beds, such as truck beds. The truck beds can have a substantial amount of cargo capacity for transporting various types of cargo (e.g., motorcycles, all-terrain vehicles, utility-terrain vehicles, outdoor power equipment, such as riding lawn mowers, lawn aerators, and tractors, large furniture, appliances, all construction materials, such as gravel, topsoil, sand, stones, mulch, and the like). Occupants may use hand carts, dollies, and wheelbarrows, and ramps to load and unload the cargo that do not already have their own wheels. Certain loading ramps may have slip-resistant surfaces and arched configurations for loading convenience. Transporting these ramps from a loading site to an unloading site can occupy storage space in the vehicle that may otherwise be used to transport additional cargo.

Thus, while the current loading ramps achieve their intended purpose, there is a need for a new and improved loading ramp that addresses these issues.

SUMMARY

According to several aspects, a cargo loading system ("system") is provided for a vehicle. The system includes a compressor for pressurizing a fluid, and the compressor has an inlet and an outlet. The system further includes a deployable ramp ("ramp") having one or more rigid elements with a surface for supporting a load. The ramp further includes one or more bladders that define a chamber fluidly connected to the outlet of the compressor, with the bladder being adapted to receive the fluid from the compressor. The bladder is attached to the rigid element, and the bladder is movable to a collapsed state where the chamber has a first volume. The bladder is further movable to an expanded state where the chamber has a second volume, with the second volume being higher than the first volume. The bladder contains a pressurized fluid for supporting the rigid element, in response to the bladder receiving the fluid from the compressor.

In one aspect, the inlet of the compressor is adapted to fluidly connect to the chamber of the bladder and configured to draw fluid from the bladder.

In another aspect, the bladder includes a first wall portion, a second wall portion facing the first wall portion, and a plurality of tethers attaching the first and second wall portions to one another.

In another aspect, the rigid element is attached to the first and/or second wall portions.

According to several aspects, a deployable ramp ("ramp") is provided for a cargo loading system ("system") of a vehicle. The ramp includes one or more rigid elements having a surface for supporting a load. The ramp further includes one or more bladders defining a chamber, which is fluidly connected to an outlet of a compressor and adapted to receive a fluid from the compressor. The bladder is attached to the rigid element and movable to a collapsed state where the chamber has a first volume. The bladder is further movable to an expanded state where the chamber has a second volume, with the second volume being higher than the first volume. The bladder contains a pressurized fluid for supporting the rigid element, in response to the bladder receiving the fluid from the compressor.

In one aspect, the bladder includes a first wall portion, a second wall portion facing the first wall portion, and a plurality of tethers attaching the first and second wall portions to one another.

In another aspect, the rigid element is attached to the first and/or second wall portions.

In another aspect, the tethers have a common length, with the first and second wall portions being planar and positioned parallel relative to one another, in response to the bladder being moved to the expanded state. The first and second wall portions are spaced from one another by the common length of the tethers.

In another aspect, the rigid element includes one or more plates attached to the first and/or second wall portions.

In another aspect, the plate is a single upper plate attached to the first wall portion.

In another aspect, the plates include a single upper plate attached to the first wall portion and a single lower plate attached to the second wall portion.

In another aspect, the plates include multiple upper plates, with each of the upper plates having a peripheral edge portion surrounding a center portion, with the peripheral edge portion being attached to the first wall portion.

In another aspect, the first wall portion includes multiple attachment surface areas that are attached to an associated one of the peripheral edge portions of the plates. The first wall portion further includes adjoining surface areas between the attachment surface areas. The adjoining surface areas are free of the plates to permit the bladder to fold along the adjoining surface areas of the first wall, in response to the bladder moving to the collapsed state.

In another aspect, the bladder further includes a pair of non-perpendicular tethers, with each non-perpendicular tether attaching a pair of predetermined anchor points of an associated one of the first and second wall portions. The anchor points are disposed on opposite sides of an adjoining surface, and each non-perpendicular tether is configured to be positioned non-perpendicular to the first and second wall portions when the bladder is moved to the expanded state. The length of one of the non-perpendicular tethers is different from the length of the other of the non-perpendicular tethers, such that the non-perpendicular tethers pull the first and second wall portions toward one another and increase resistance to folding when the bladder is moved to the expanded state.

In another aspect, the plates include multiple upper plates attached to the first wall portion of the bladder, with each upper plate having a first peripheral edge portion. The plates further include one or more lower plates attached to the second wall portion of the bladder, with each lower plate having a second peripheral edge portion. The bladder has a bisecting axis, with the upper and lower wall portions being disposed on an associated one of two opposing sides of the bisecting axis. The first peripheral edge portion of the upper plate is spaced from the second peripheral edge portion of the lower plate by an offset distance in a direction along the bisecting axis. The first and second wall portions are spaced from one another by a bladder thickness, and the bladder thickness is greater than the offset distance.

In another aspect, the rigid element is a frame with a grating that has the surface for supporting the load, and the bladders includes multiple closed air tubes with each closed air tube having a length that is less than a predetermined maximum threshold.

In another aspect, the frame includes two or more sub-panels attached to one another at a coupling, such that the bladder moves to the expanded state in response to the sub-panels being co-planar with one another and the at least one bladder is moved to the collapsed state in response to the sub-panels being folded on top of one another.

In another aspect, the rigid element includes a pair of side rails attached to an associated one of opposing sides of the bladder, with each of the side rails having first and second ends. The rigid elements further include a first linkage assembly for attaching the first ends of the associated side rails to one another. The rigid elements further include a second linkage assembly for attaching the second ends of the associated side rails to one another. Each of the first and second linkage assemblies are configured to move the side rails toward one another such that the bladder is disposed in the collapsed state and away from one another such that the bladder is disposed in the expanded state.

According to several aspects, a method of operating a deployable ramp ("ramp") for a cargo loading system ("system") of a vehicle. The method includes fluidly connecting a chamber, defined by a bladder, to an outlet of a compressor. The method further includes receiving, using the chamber, a fluid from the compressor, with the bladder being attached to the rigid element in response to fluidly connecting the chamber to the outlet of the compressor. The method further includes moving the bladder to a collapsed state where the chamber has a first volume. The method further includes moving the bladder to an expanded state where the chamber has a second volume, with the second volume being higher than the first volume. The chamber contains a pressurized fluid, in response to the chamber receiving the fluid from the compressor. The method further includes supporting, using the bladder, the rigid element in response to the bladder receiving the fluid from the compressor. The method further includes supporting, using the rigid element, a load.

In one aspect, the method further includes fluidly connecting an inlet of the compressor to the chamber to draw fluid from the chamber and move the bladder from the expanded state to the collapsed state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 1B is a bottom plan view of the panel assembly of FIG. 1A, illustrating the bladder having an exemplary predetermined shape for reinforcing the load-bearing plate.

FIG. 1C is a cross-sectional view of the ramp of FIG. 1B, illustrating the ramp having a plate and a bladder with drop stitch knitting for supporting the plate.

FIG. 3A is a cross-sectional view of yet another example of the panel assembly of FIG. 1C, illustrating the panel assembly having first and second upper plates and a bladder supporting the first and second upper plates.

FIG. 3B is a cross-sectional view of the panel assembly of FIG. 3A, illustrating the bladder being deflated.

FIG. 3C is a cross-sectional view of the panel assembly of FIG. 3B, illustrating the panel assembly being folded for storage.

FIG. 4A is a cross-sectional view of still another example of the panel assembly of FIG. 1C, illustrating the panel assembly being deployed from a collapsed state.

DETAILED DESCRIPTION

Figure 1A:
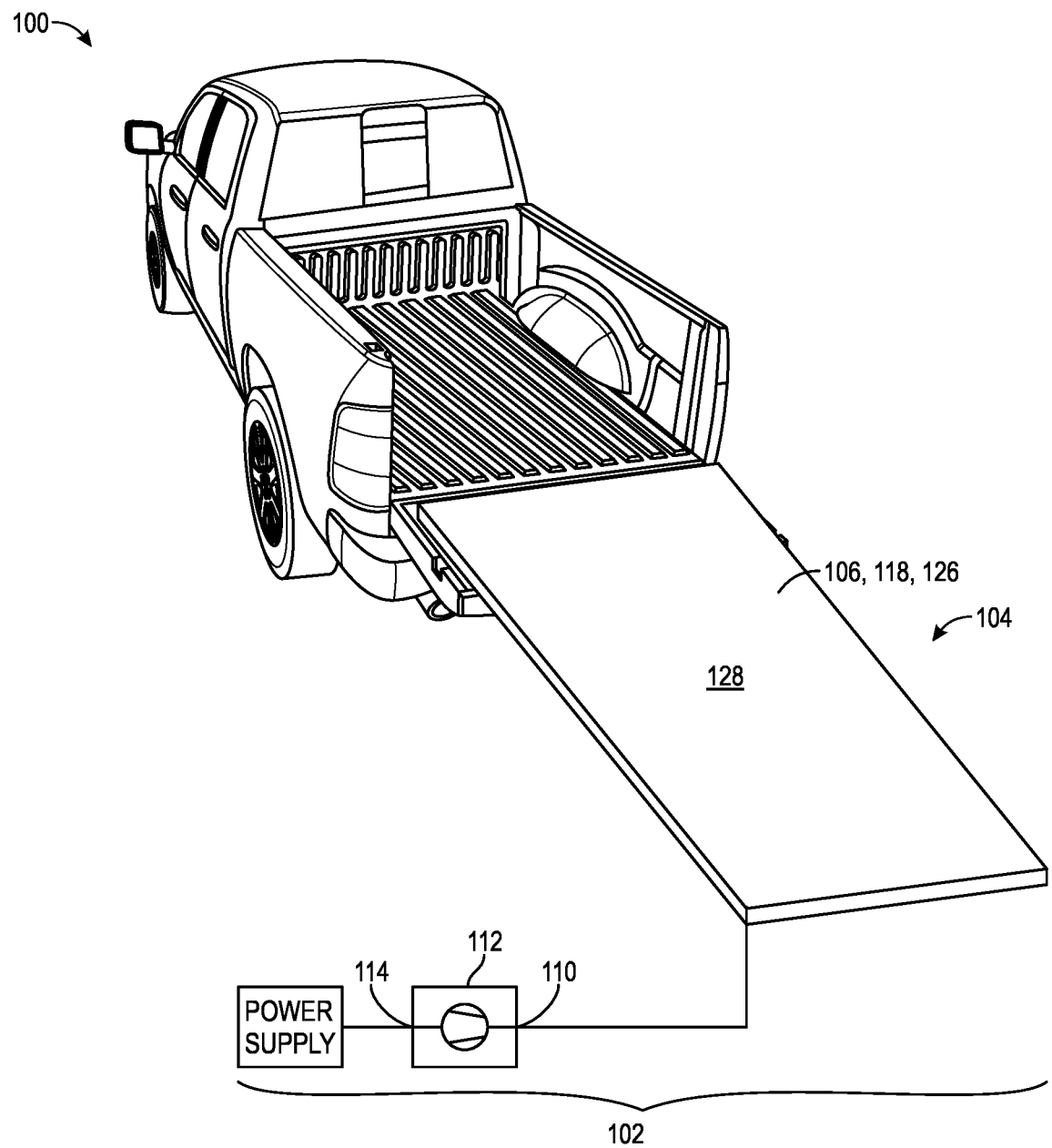
FIG. 1A is a perspective view of one non-limiting example of a vehicle having a cargo system including a deployable ramp and a compressor.

The following description is merely exemplary in nature and is not intended to limit the present disclosure, application, or uses.

Referring to FIGS. 1A-1D, there is generally illustrated one non-limiting example of a vehicle 100 having a cargo system 102 ("system") including a deployable ramp 104 ("ramp"). In this non-limiting example, the vehicle 100 is a truck having a truck bed for storing cargo that can be accessed by the system 102 and the ramp 104. In other non-limiting examples, the vehicle may include a box van, a sports utility vehicle, a wagon, a bus, a train, other land vehicles, an aircraft, a watercraft, and the like, which have a cargo bed, storage space, luggage compartment, or other suitable space for storing cargo. As described in detail below, the ramp 104 includes one or more rigid elements 106 and one or more bladders 108. The combination of the rigid element 106 and the inflated bladder 108 is configured to support a total load above a predetermined threshold, in response to the bladder 108 receiving fluid from an outlet 110 of the compressor 112. In addition, the combination of the rigid element 106 and the inflated bladder 108 provides the ramp 104 with a mass below a predetermined mass threshold, such that the ramp may provide versatility. The movement of the ramp 104 to a collapsed state (i.e., via deflating the bladder and folding of the ramp 104) may provide the ramp 104 with a size below a predetermined size threshold for convenient storage on a vehicle and providing more available space for loading cargo onto the vehicle 100. In this non-limiting example, the system 102 includes a compressor 112 having an inlet 114 and an outlet 110. The compressor 112 is configured to increase the pressure of a fluid. In other examples, the system may not include the compressor.

Each one of the bladders 108 defines a chamber 116 fluidly connected to an outlet 110 of the compressor 112 to receive the fluid from the compressor 112 and move the ramp 104 from a collapsed state to an expanded state, in response to the bladder 108 receiving the fluid from the compressor 112. In the expanded state, the bladder 108 supports the rigid element 106 and any load on the rigid element 106.

Referring to FIG. 1B, the bladder 108 has an X-shaped configuration to reinforce predetermined sections of the rigid element 106 (e.g., surface area portions of a single upper plate 118 that are empirically determined to deform or dimple under a load without the bladder 108). In other examples, the ramp can include any number of bladders and have any suitable shape attached to any portion of the rigid element.

Figure 1D:
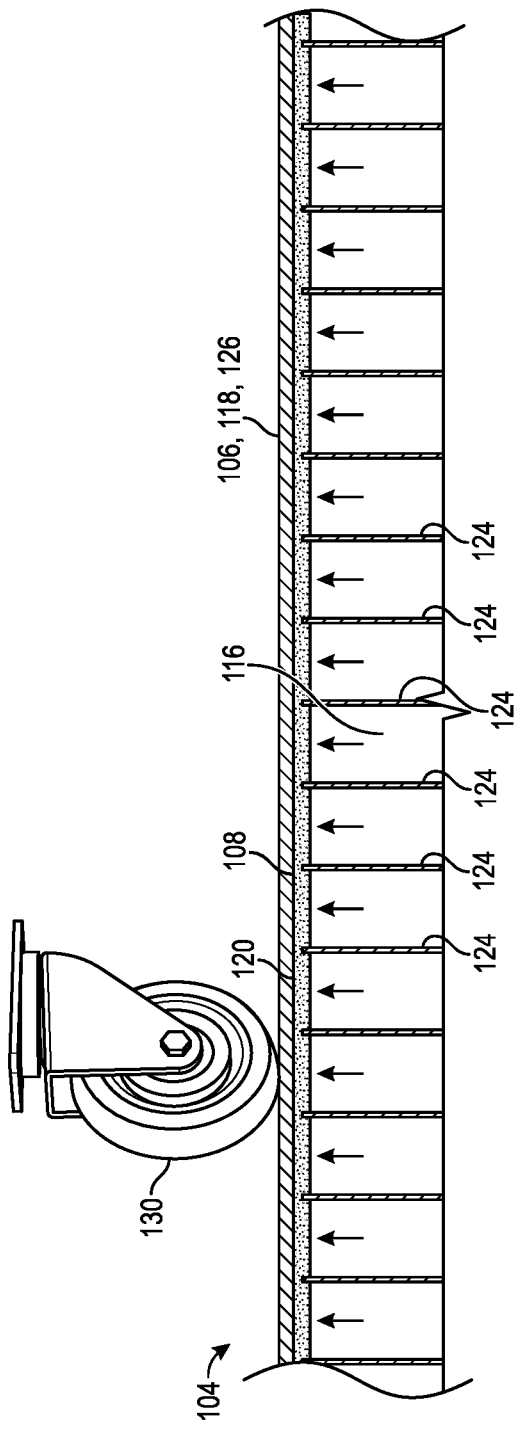
FIG. 1D is an enlarged view of the panel assembly of FIG. 1A, illustrating the bladder and the load-bearing plate supporting a load.

Referring to FIGS. 1C and 1D, the bladder 108 includes a first wall portion 120, a second wall portion 122 facing the first wall portion 120 to define a cavity, and a plurality of tethers 124 (e.g., drop stitch tethers, etc.) attaching the first and second wall portions 120, 122 to one another and disposed within the cavity. The tethers 124 hold the first and second wall portions 120, 122 in predetermined positions relative to another, such that the bladder 108 has a predetermined thickness and shape. In this non-limiting example, the tethers 124 have a common length, such that the first and second wall portions 120, 122 are planar and positioned parallel relative to one another and spaced from one another by the common length of the tethers 124, in response to the bladder 108 being moved to the expanded state.

The rigid elements may include one or more plates 126 (e.g., metal panels with or without perforations, non-slip surfaces, etc.) attached to the first and/or second wall portions 120, 122. In this non-limiting example, the rigid element 106 is a single upper plate 118 attached to the first wall portion 120. Each rigid element 106 is attached to one or more associated bladders 108. The rigid element 106 has a surface 128 for supporting a load 130 (FIG. 1D), such that the ramp 104 provides a rigid stable surface for supporting rolling wheels and blocks the load 130 from deforming the bladder 108 (i.e., dimpling of the bladder, etc.).

Figure 2:
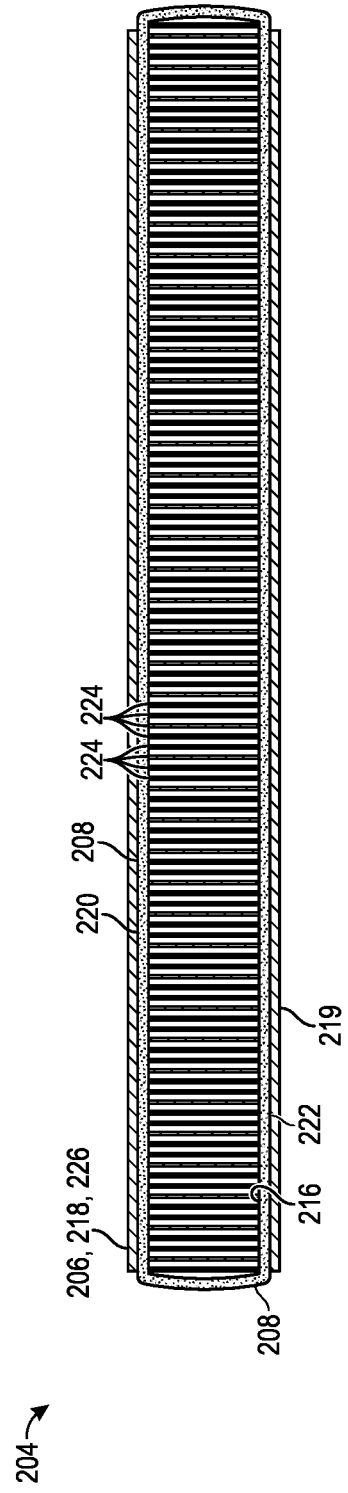
FIG. 2 is a cross-sectional view of another example of the panel assembly of FIG. 1C, illustrating the panel assembly having an upper plate, a bladder supporting the upper plate, and a lower plate supporting the bladder.

Referring now to FIG. 2, another non-limiting example of a ramp 204 is similar to the ramp 104 of FIG. 1C and includes the same components identified by the same numbers increased by 100. However, while the ramp 104 of FIG. 1C includes a single upper plate 118 attached to the first wall portion 120, the ramp 204 includes a single upper plate 218 attached to the first wall portion 120 and a single lower plate 219 attached to the second wall portion 222.

Referring to FIGS. 3A-3C, yet another non-limiting example of a ramp 304 is similar to the ramp 104 of FIG. 1C and has the same components identified by the same numbers increased by 200. However, while the ramp 104 of FIG. 1C has a single upper plate 118 attached to the first wall portion 120, the ramp 304 includes two upper plates 318a, 318b attached to the first wall portion 320 of the bladder 308. More specifically, the first wall portion 320 includes multiple attachment surface areas (e.g., two attachment surface areas 332a, 332b) attached to an associated one the two upper plates 318a, 318b and the first wall portion 320 further includes an adjoining surface area 334 (e.g., a strip surface area) that is disposed between the attachment surface areas 332a, 332b. As best shown in FIG. 3C, the adjoining surface area 334 is free of the plates to permit the bladder 308 to fold along the adjoining surface areas 334 of the first wall portion 320 in response to the bladder 308 moving to the collapsed state.

The inlet 314 of the compressor 312 is adapted to fluidly connect to the chamber 316 of the bladder 308 and configured to draw fluid from the bladder 308 and move the ramp 304 from the expanded state (FIG. 3A) toward the collapsed state (FIG. 3C). In particular, the bladder 308 is movable to the collapsed state (FIG. 3C) where the chamber has a first volume, and the bladder 308 is further movable to the expanded state (FIG. 3A) where the chamber 316 has a second volume, with the second volume being higher than the first volume.

Figure 4B:
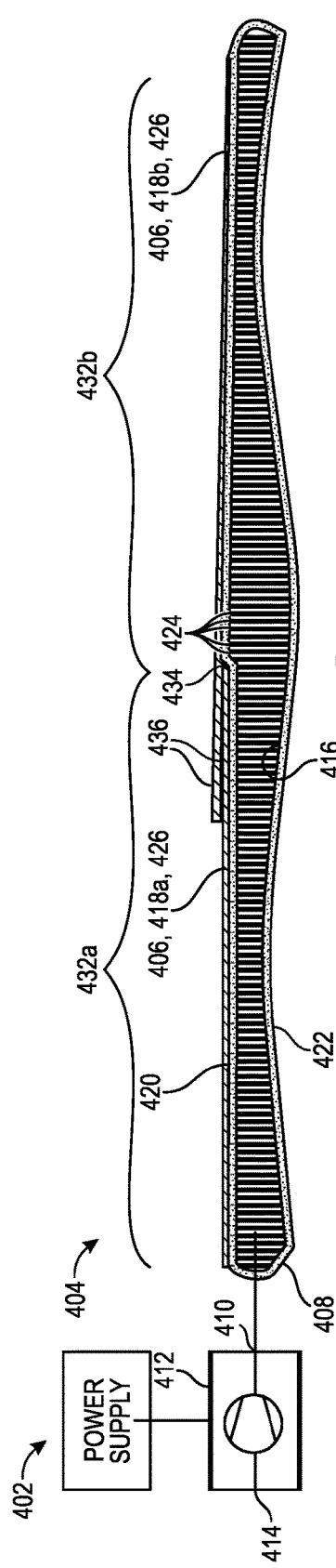
FIG. 4B is a cross-sectional view of the panel assembly of FIG. 4A, illustrating the bladder inflating to overlap end portions of the first and second upper plates.
Figure 4C:
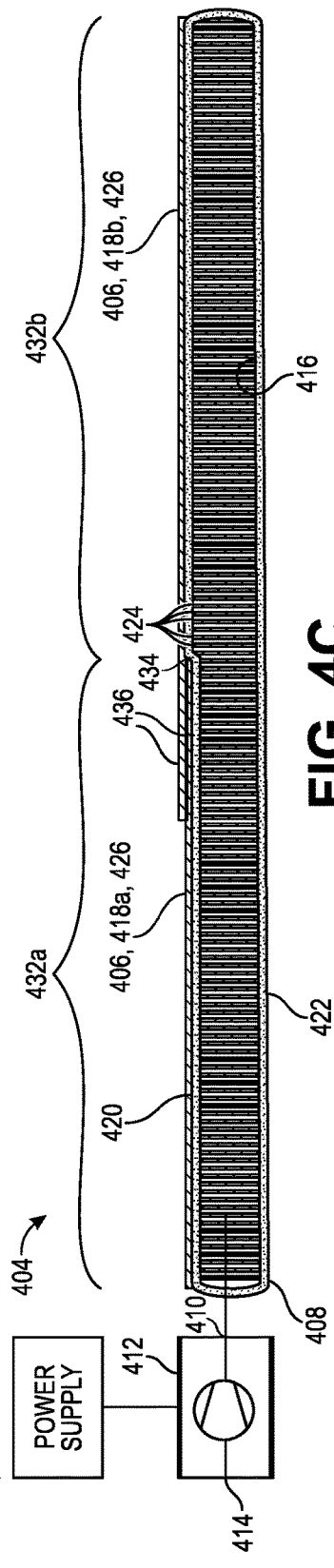
FIG. 4C is a cross-sectional view of the panel assembly of FIG. 4B, illustrating the bladder fully inflated for supporting the first and second upper plates.

Referring to FIGS. 4A-4C, still another non-limiting example of a ramp 404 is similar to the ramp 104 of FIG. 1C and has the same components identified by the same numbers increased by 300. However, while the ramp 104 of FIG. 1C has a single upper plate 118 attached to the first wall portion 120, the ramp 404 includes two upper plates 418a, 418b attached to the first wall portion 420 of the bladder 408, and the upper plates 418a, 418b include edge portions 436 that overlap and support one another.

Figure 5:
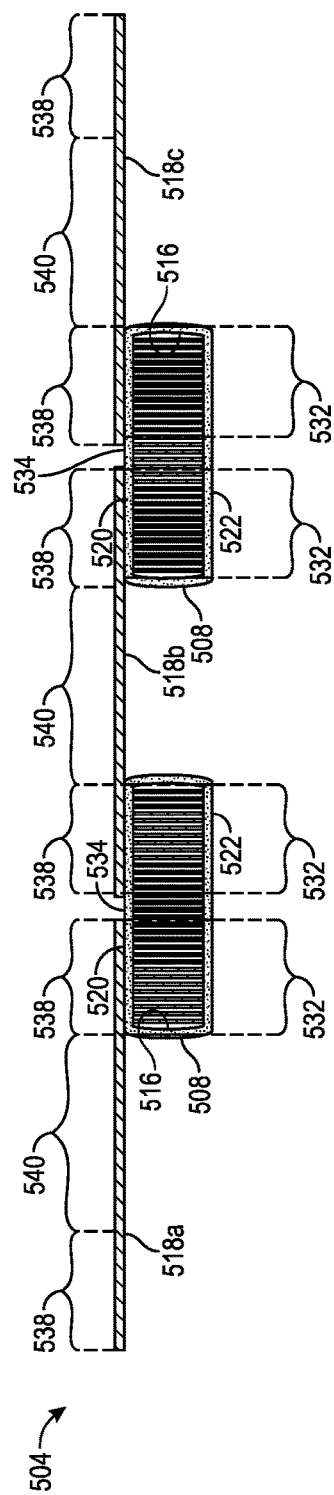
FIG. 5 is a cross-sectional view of yet another example of the panel assembly of FIG. 1C, illustrating the panel assembly having multiple upper plates and bladders supporting adjacent ends of the upper plates.

Referring to FIG. 5, another non-limiting example of a ramp 504 is similar to the ramp 104 of FIG. 1C and has the same components identified by the same numbers increased by 400. However, while the ramp 104 of FIG. 1C includes the single upper plate 118 attached to and supported by the first wall portion 120 of the bladder 108, the ramp 504 includes multiple upper plates (e.g., three upper plates 518a, 518b, 518c etc.), with each upper plate having a peripheral edge portion 538 surrounding a center portion 540, and the peripheral edge portion 538 being attached to the first wall portion 520 and the center portion 540 being free of the bladders 508. More specifically, the first wall portion 520 of each bladder 508 includes multiple attachment surface areas 534 attached to an associated one of peripheral edge portions 538 of the upper plates. The first wall portion 520 further includes multiple adjoining surface areas (e.g., strip surface areas) between the attachment surface areas 532. As best shown in FIG. 3C, the adjoining surface areas 534 are free of the plates to permit the bladder 508 to fold along the adjoining surface areas 534 of the first wall portion 520 in response to the bladder 508 moving to the collapsed state.

Figure 6A:
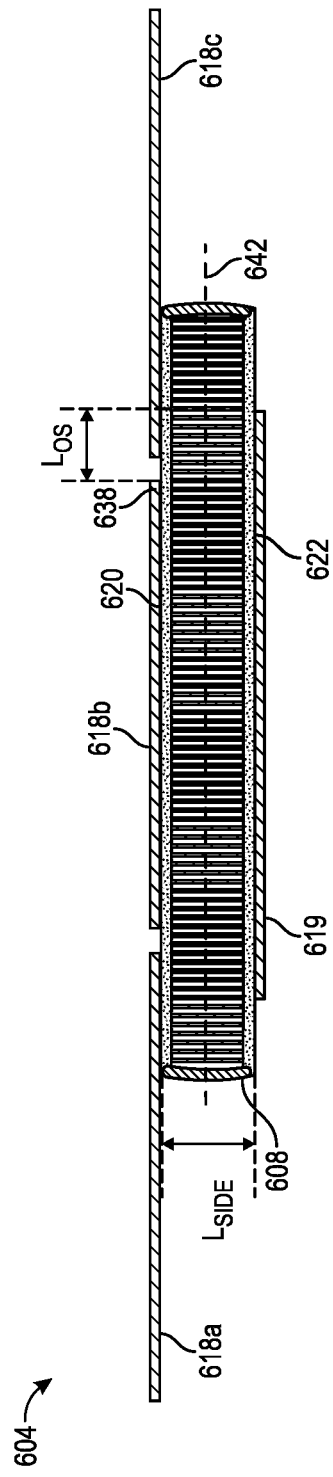
FIG. 6A is a cross-sectional view of another example of the panel assembly of FIG. 1C, illustrating the panel assembly further having a lower plate supporting a portion of the bladder that is positioned under adjacent ends of the upper plates.
Figure 6B:
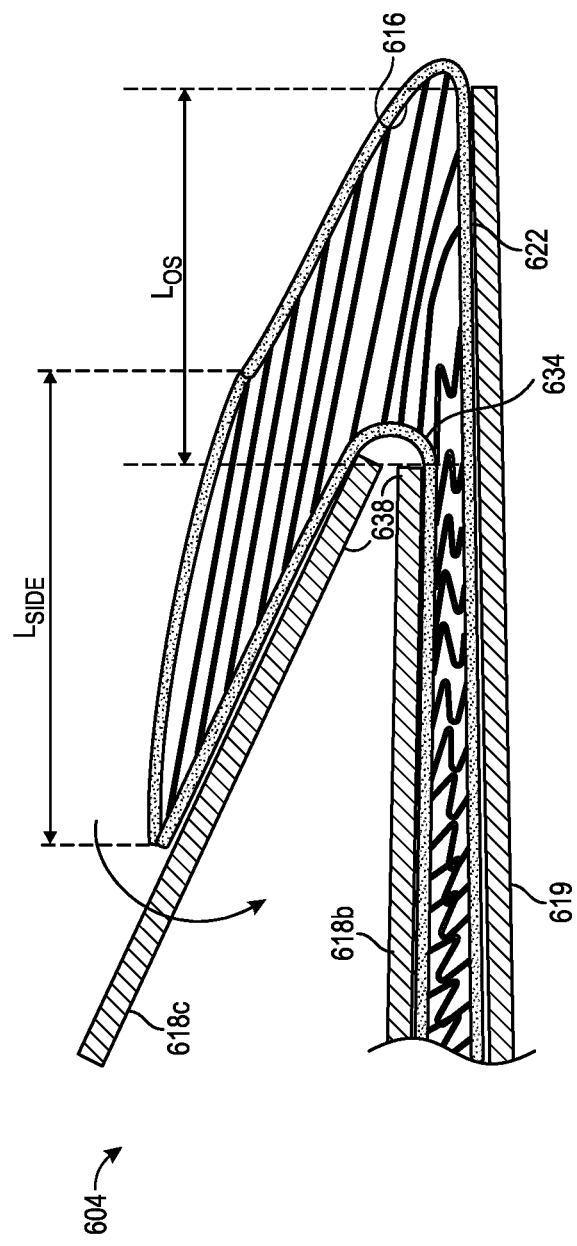
FIG. 6B is an enlarged cross-sectional view of the panel assembly of FIG. 6A, illustrating the bladder attached to the upper and lower plates and configured to fold.

Referring to FIGS. 6A and 6B, yet another non-limiting example of a ramp 604 is similar to the ramp 104 of FIG. 1C and has the same components identified by the same numbers increased by 500. However, while the ramp 104 of FIG. 1C has a single upper plate 118 attached to the first wall portion 120, the ramp 604 has multiple upper plates (e.g., three upper plates 618a, 618b, 618c attached to the first wall portion 620 and a lower plate 619 attached to the second wall portion 622. Each of the upper plates has a first peripheral edge portion 638, and the lower plate 619 has a second peripheral edge portion 638. The bladder 608 has a bisecting axis 642, and the upper and lower wall portions 620, 622 are disposed on an associated one of two opposing sides of the bisecting axis 642. The first peripheral edge portion 638 of the upper plate is spaced from the second peripheral edge portion 638 of the lower plate 619 by an offset distance $L_{OS}$ in a direction along the bisecting axis 642. The first and second wall portions 620, 622 are spaced from one another by a bladder thickness $L_{side}$. The bladder 608 is sized such that the bladder thickness $L_{side}$ is greater than the offset distance $L_{OS}$, allowing for full, 180 degree folding without stressing or damaging the constituent elements.

Figure 7A:
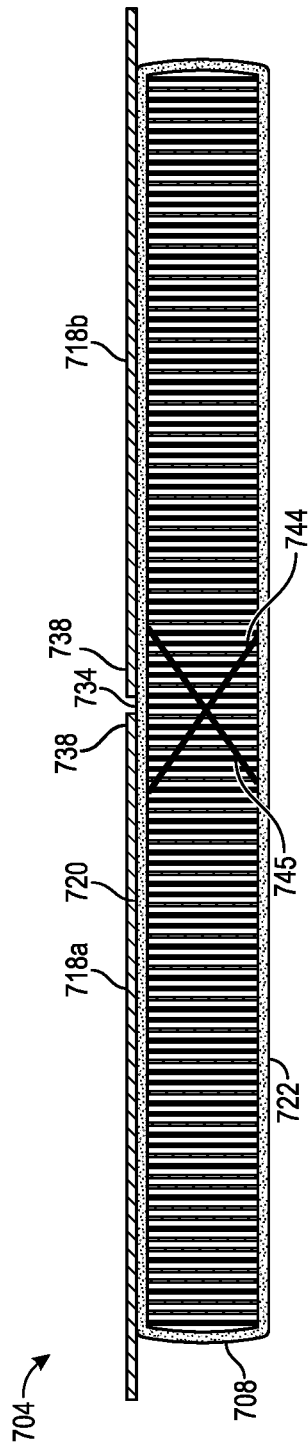
FIG. 7A is a cross-sectional view of another example of the panel assembly of FIG. 1C, illustrating the bladder further having a tether attaching upper and lower sheets to one another.
Figure 7B:
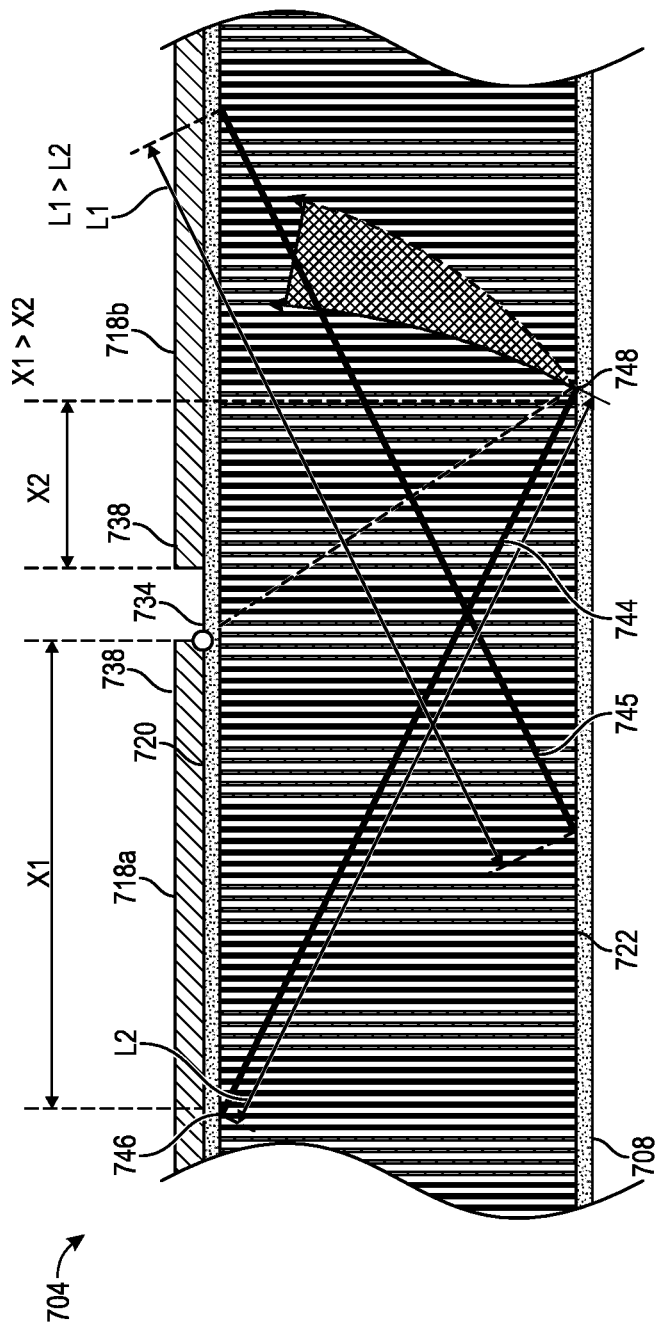
FIG. 7B is an enlarged view of the bladder of FIG. 7A, illustrating the tether for bending the bladder along a crease that increases pressure of the bladder and increases an associated force that opposes folding of the bladder and supports the upper plates.

Referring to FIGS. 7A and 7B, still another non-limiting example of a ramp 704 is similar to the ramp 104 of FIG. 1C and has the same components identified by the same numbers increased by 600. However, while the ramp 104 of FIG. 1C has a single upper plate 118 attached to the first wall portion 120, the ramp 704 has multiple upper plates (e.g., two upper plates 718a, 718b, etc.) attached to the first wall portion 720 of the bladder 708. In addition, the bladder 708 further includes one or more non-perpendicular tethers (e.g., non-perpendicular tethers 744, 745), with each one of the non-perpendicular tethers 744, 745 attaching a pair of predetermined anchor points 746, 748 of an associated one of the first and second wall portions 720, 722. The anchor points 746, 748 are disposed on opposite sides of an adjoining surface 734 (e.g., a bending location associated with a strip surface area in a gap between the plates 718a, 718b). The non-perpendicular tethers 744, 745 are configured to be positioned non-perpendicular to the first and second wall portions 720, 722 when the bladder 708 is moved to the expanded state. The length of the non-perpendicular tether 744 is different from the length of the non-perpendicular tether 745, such that the non-perpendicular tethers 744, 745 pull the first and second wall portions 720, 722 toward one another and increase resistance to folding along the plate boundaries (e.g., the adjoining surface 734) when the bladder 708 is moved to the expanded state.

Figure 8A:
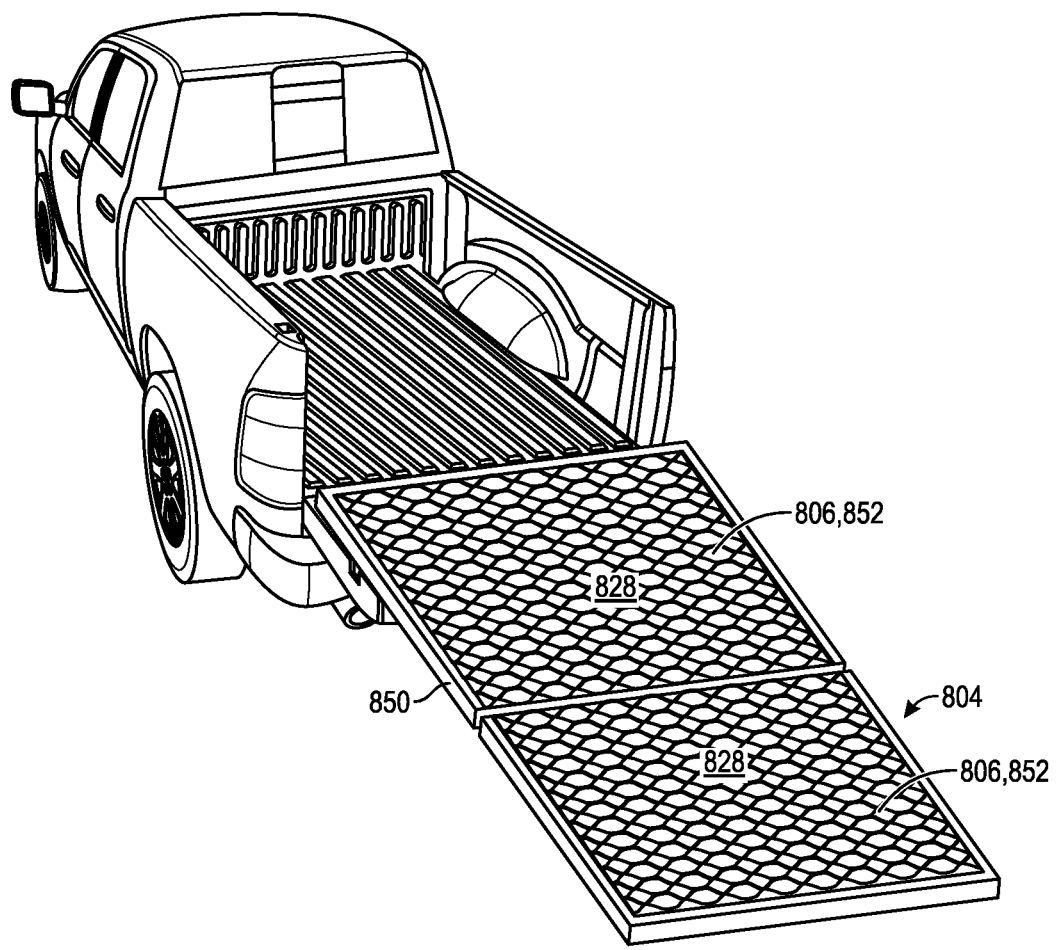
FIG. 8A is a perspective view of still another example of the panel assembly of FIG. 1C, illustrating the panel assembly having multiple bladders enclosed within by a frame to provide a ramp for a truck bed.
Figure 8B:
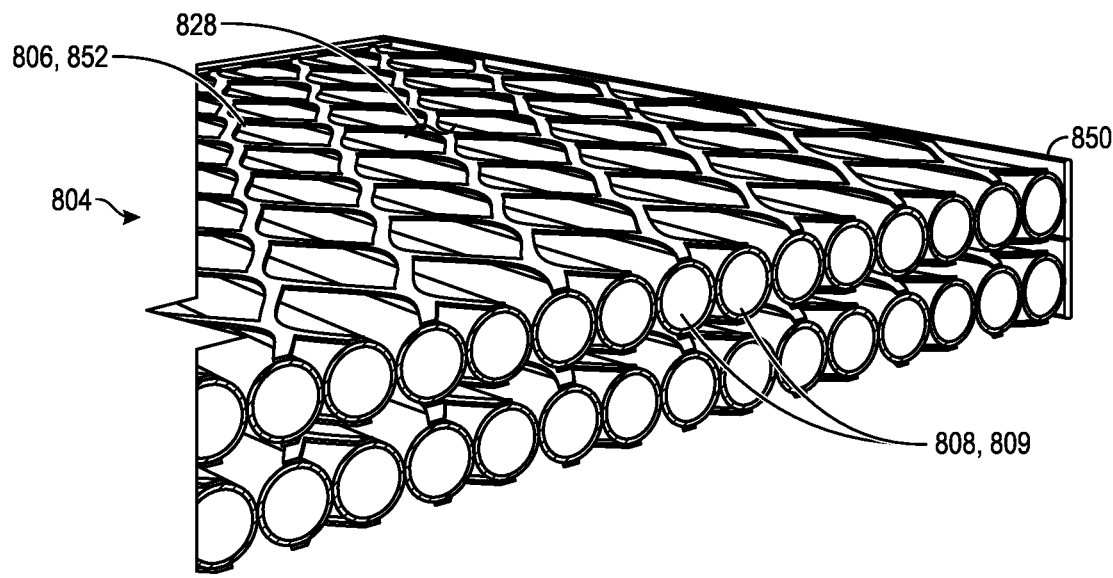
FIG. 8B is a cross-sectional view of the panel assembly of FIG. 8A, as taken along line 8B-8B, illustrating a lateral cross-section of multiple bladders.
Figure 8C:
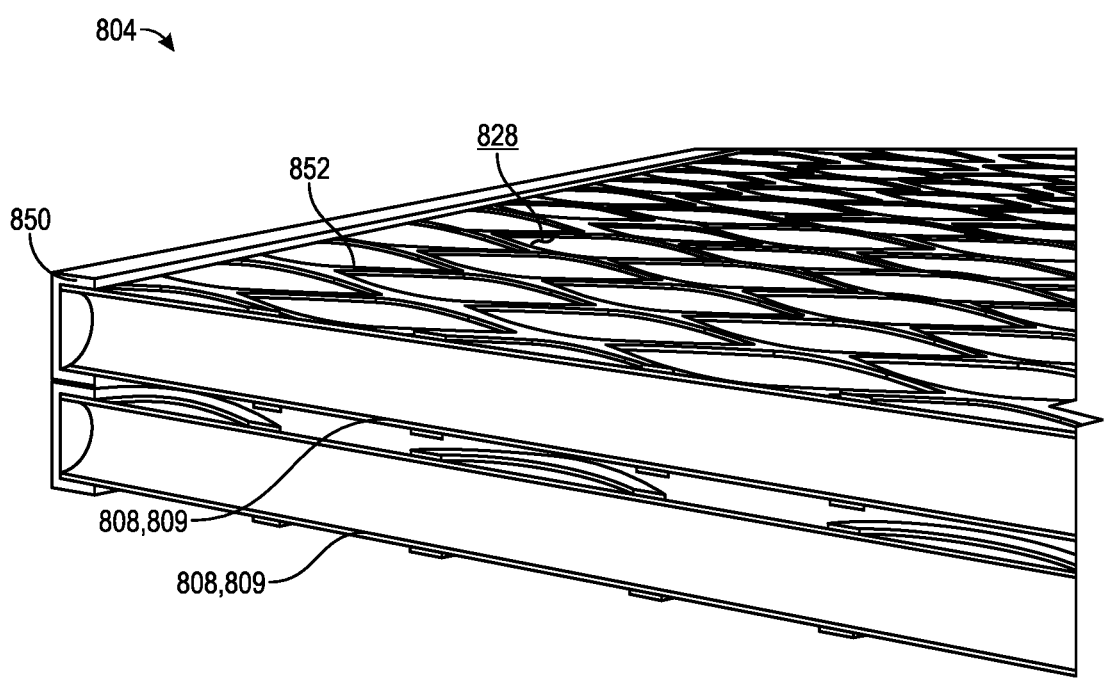
FIG. 8C is a cross-sectional view of the panel assembly of FIG. 8A, as taken along line 8C-8C, illustrating a longitudinal cross-section of multiple bladders.

Referring to FIGS. 8A-8C, still another non-limiting example of a ramp 804 is similar to the ramp 104 of FIG. 1C and has the same components identified by the same numbers increased by 600. However, while the ramp 104 of FIG. 1C has one rigid element 106 in the form of a single upper plate 118 attached to the first wall portion 120 of a single bladder 108, the ramp 804 includes two rigid elements in the form of a frame 850 with a grating 852 having the surface 828 for supporting the load. Also, in this non-limiting example, the bladder 808 includes a plurality of closed air tubes 809, and each of these closed air tubes 809 may have a length that is less than a predetermined maximum threshold to decrease deflection of the associated closed air tube 809 in a direction that is transverse to a longitudinal axis of the closed air tube 809 when the closed air tube 809 receives a load in the same direction.

Figure 9A:
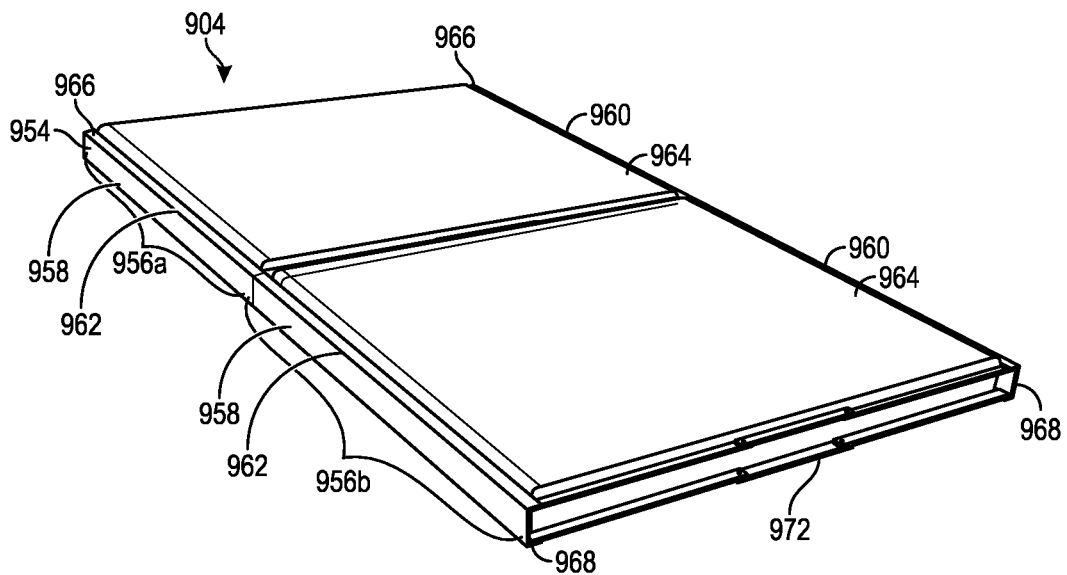
FIG. 9A is perspective view of another example of the panel assembly of FIG. 1C, illustrating the panel assembly having multiple bladders attached to a collapsible frame.
Figure 9B:
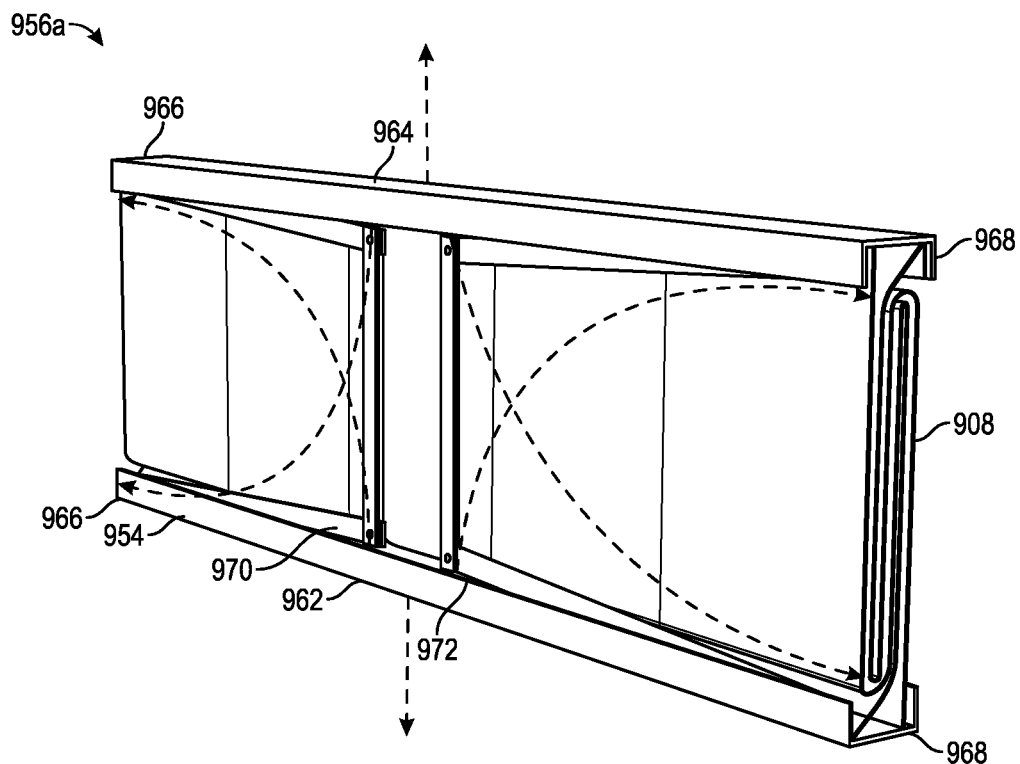
FIG. 9B is an enlarged perspective view of the panel assembly of FIG. 9A, illustrating of the frame for moving the bladder between collapsed and expanded states.

Referring to FIGS. 9A and 9B, yet another non-limiting example of a ramp 904 is similar to the ramp 104 of FIG. 1C and has the same components identified by the same numbers increased by 600. However, while the ramp 104 of FIG. 1C has one rigid element 106 in the form of a single upper plate 118 attached to the first wall portion 120 of a single bladder 108, the ramp 904 has a rigid element 906 in the form of a frame 954 having two or more sub-panels 956a, 956b attached to one another at a coupling (e.g., a piano hinge, a hook fastener, etc.), such that the bladder 908 moves to the expanded state in response to the sub-panels 956a, 956b being co-planar with one another and the at least one bladder is moved to the collapsed state, in response to the sub-panels 956a, 956b being folded on top of one another.

More specifically, the frame 954 includes a pair of side rails 958, 960 attached to an associated one of opposing sides 962, 964 of the bladder 908, with each of the side rails having first and second ends 966, 968. The frame 954 further includes a first linkage assembly 970 attaching the first ends 966 of the associated side rails 958, 960 to one another. The frame 954 further includes a second linkage assembly 972 attaching the second ends 968 of the associated side rails 958, 960 to one another. Each of the first and second linkage assemblies 970, 972 are configured to move the side rails 958, 960 toward one another, such that the bladder 908 is disposed in the collapsed state and away from one another such that the bladder 908 is disposed in the expanded state.

A method is provided for operating the ramp 104 of FIG. 1 for the system 102. The method includes fluidly connecting the chamber 116, defined by the bladder 108, to the outlet of the compressor 112. The method further includes receiving, using the chamber 116 of the bladder 108, the fluid from the compressor 112, with the bladder 108 attached to the rigid element 106. The method further includes moving the bladder 108 to the collapsed state where the chamber 116 has a first volume. The method further includes moving the bladder 108 to the expanded state where the chamber 116 contains a pressurized fluid and has a second volume, with the second volume being higher than the first volume. The method further includes supporting, using the bladder 108, the rigid element, in response to the bladder 108 receiving the fluid from the compressor 112. The method further includes supporting, using the rigid element 106, a load.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cargo loading system for a vehicle, the cargo loading system comprising:
   a compressor having an inlet and an outlet, the compressor for pressurizing a fluid; and
   a deployable ramp comprising:
   at least one rigid element having a surface for supporting a load; and
   at least one bladder defining a chamber fluidly connected to the outlet of the compressor and adapted to receive the fluid from the compressor, the at least one bladder attached to the at least one rigid element, the at least one bladder is movable to a collapsed state where the chamber has a first volume, the at least one bladder is further movable to an expanded state where the chamber has a second volume and contains a pressurized fluid for supporting the at least one rigid element in response to the at least one bladder receiving the fluid from the compressor, with the second volume being higher than the first volume, wherein the inlet of the compressor is adapted to fluidly connect to the chamber of the at least one bladder and configured to draw fluid from the at least one bladder, and wherein the at least one bladder comprises:
   a first wall portion;
   a second wall portion facing the first wall portion; and
   a plurality of tethers attaching the first and second wall portions to one another.

2. The cargo loading system of claim 1 wherein the at least one rigid element is attached to at least one of the first and second wall portions.

3. A deployable ramp for a cargo loading system of a vehicle, the deployable ramp comprising:
   at least one rigid element having a surface for supporting a load; and
   at least one bladder defining a chamber fluidly connected to an outlet of a compressor and adapted to receive a fluid from the compressor, the at least one bladder attached to the at least one rigid element, the at least one bladder is movable to a collapsed state where the chamber has a first volume, the at least one bladder is further movable to an expanded state where the chamber has a second volume and contains a pressurized fluid for supporting the at least one rigid element in response to the at least one bladder receiving the fluid from the compressor, with the second volume being higher than the first volume, wherein the at least one bladder comprises:
   a first wall portion;
   a second wall portion facing the first wall portion; and
   a plurality of tethers attaching the first and second wall portions to one another.

4. The deployable ramp of claim 3 wherein the at least one rigid element is attached to at least one of the first and second wall portions.

5. The deployable ramp of claim 3 wherein the plurality of tethers have a common length, with the first and second wall portions being planar and positioned parallel relative to one another in response to the at least one bladder being moved to the expanded state, with the first and second wall portions being spaced from one another by the common length of the tethers.

6. The deployable ramp of claim 5 wherein the at least one rigid element comprises at least one plate attached to at least one of the first and second wall portions.

7. The deployable ramp of claim 5 wherein the at least one plate comprises a single upper plate attached to the first wall portion.

8. The deployable ramp of claim 5 wherein the at least one plate comprises a single upper plate attached to the first wall portion and a single lower plate attached to the second wall portion.

9. The deployable ramp of claim 5 wherein the at least one plate comprises a plurality of upper plates, with each of the upper plates having a peripheral edge portion surrounding a center portion, and the peripheral edge portion being attached to the first wall portion.

10. The deployable ramp of claim 9 wherein the first wall portion includes a plurality of attachment surface areas attached to an associated one of the peripheral edge portions of the plates, and the first wall portion further includes a plurality of adjoining surface areas between the attachment surface areas, with the adjoining surface areas being free of the plates to permit the at least one bladder to fold along the adjoining surface areas of the first wall in response to the at least one bladder moving to the collapsed state.

11. The deployable ramp of claim 10 wherein the at least one bladder further includes a pair of non-perpendicular tethers, with each non-perpendicular tether attaching a pair of predetermined anchor points of an associated one of the first and second wall portions, the anchor points being disposed on opposite sides of an adjoining surface, each of the non-perpendicular tethers is configured to be positioned non-perpendicular to the first and second wall portions when the bladder is moved to the expanded state, the length of one of the non-perpendicular tethers is different from the length of the other of the non-perpendicular tethers, such that the non-perpendicular tethers pull the first and second wall portions toward one another and increase resistance to folding when the bladder is moved to the expanded state.

12. The deployable ramp of claim 5 wherein the at least one plate includes:
    a plurality of upper plates attached to the first wall portion of the at least one bladder, with each of the upper plates having a first peripheral edge portion; and
    at least one lower plate is attached to the second wall portion of the at least one bladder, with the at least one lower plate having a second peripheral edge portion;
    where the at least one bladder has a bisecting axis, and the upper and lower wall portions are disposed on an associated one of two opposing sides of the bisecting axis; and
    where the first peripheral edge portion of the upper plate is spaced from the second peripheral edge portion of the lower plate by an offset distance in a direction along the bisecting axis;
    where the first and second wall portions are spaced from one another by a bladder thickness; and
    where the bladder thickness is greater than the offset distance.

13. The deployable ramp of claim 5 wherein the at least one rigid element comprises a frame with a grating having the surface for supporting the load, and the at least one bladder comprises a plurality of closed air tubes, with each of the closed air tubes having a length that is less than a predetermined maximum threshold.

14. The deployable ramp of claim 13 wherein the frame includes at least two sub-panels attached to one another at a coupling, such that the at least one bladder moves to the expanded state in response to the sub-panels being co-planar with one another and the at least one bladder is moved to the collapsed state in response to the sub-panels being folded on top of one another.

15. The deployable ramp of claim 5 wherein the at least one rigid element comprises a frame comprising:
- a pair of side rails attached to an associated one of opposing sides of the at least one bladder, with each of the side rails having first and second ends; and
- a first linkage assembly attaching the first ends of the associated side rails to one another; and
- a second linkage assembly attaching the second ends of the associated side rails to one another; and
- where each of the first and second linkage assemblies are configured to move the side rails toward one another such that the at least one bladder is disposed in the collapsed state and away from one another such that the at least one bladder is disposed in the expanded state.

16. A method of operating a deployable ramp for a cargo loading system of a vehicle, the method comprising:
- fluidly connecting a chamber defined by at least one bladder to an outlet of a compressor, wherein the at least one bladder comprises a first wall portion, a second wall portion facing the first wall portion, and a plurality of tethers attaching the first and second wall portions to one another;
- receiving, using the chamber of the at least one bladder, a fluid from the compressor, with the at least one bladder attached to the at least one rigid element in response to fluidly connecting the chamber to the outlet of the compressor;
- moving the at least one bladder to a collapsed state where the chamber has a first volume;
- moving the at least one bladder to an expanded state where the chamber has a second volume and contains a pressurized fluid, with the second volume being higher than the first volume in response to the chamber receiving the fluid from the compressor;
- supporting, using the at least one bladder, the at least one rigid element in response to the at least one bladder receiving the fluid from the compressor, and
- supporting, using at least one rigid element, a load.

17. The method of claim 16 further comprising fluidly connecting an inlet of the compressor to the chamber to draw fluid from the chamber and move the at least one bladder from the expanded state to the collapsed state.

* * * * *